Figure 1:
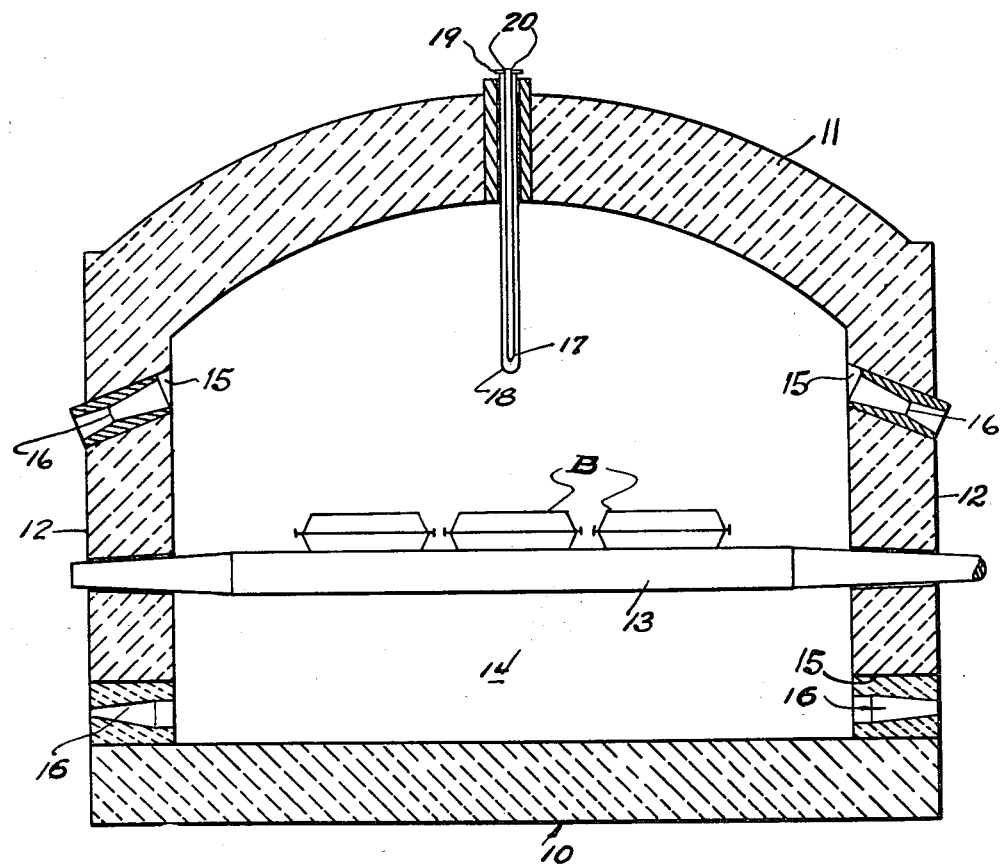

Inventor
WALTER D. FORD

By Olen E Bee
Attorney

Patented Oct. 16, 1951

2,571,700

UNITED STATES PATENT OFFICE 2,571,700

METHOD OF COATING THERMOCOUPLES

Walter D. Ford, Port Allegany, Pa., assignor to Pittsburgh Corning Corporation, Allegheny County, Pa., a corporation of Pennsylvania Application May 3, 1946, Serial No. 666,974

2 Claims. (Cl. 136—4)

The present invention relates to thermocouples and particularly to thermocouples which are employed in the measurement of elevated temperatures.

One object of the invention is to provide a simple economical method of treatment, which, after application, enables the thermocouple to operate efficiently at high temperature for longer periods of time than has previously been possible.

Another object of the invention is the provision of a thermocouple element for accurate measurement of relatively high temperatures, said unit being resistant to corrosive or reducing gases.

The use of such bi-metallic units as Chromel-Alumel and platinum-rhodium as thermocouples for the measurement of relatively high temperatures, such as occur in glass furnaces or other furnaces, is well known in the art. However, the effective life of such units is often very short because of changes in the electrical characteristics of the units due to such factors as corrosive or oxidizing action of gases formed in, or present during the operation of the furnace at high temperatures (usually in excess of 1000° F.). Usage under these conditions soon causes incorrect temperature readings necessitating replacement of the thermocouple. This results not only in operational time loss but is expensive from the standpoint of equipment and labor. For example, the thermocouples employed in the roller hearth or tunnel-like furnaces used in the manufacturing of cellular glass, where operational temperatures are about 1500 to 1700° F., have a life of approximately two weeks under conditions encountered in the furnace.

The present invention provides a method of treatment, application of which greatly increases the life of thermocouples even under such difficult conditions as those which exist in furnaces of the above-described type. Broadly stated, the invention is based upon a discovery that coatings of oxide of chromium greatly enhance the life of a thermocouple at relatively high temperatures. The invention contemplates the use of certain chromium compounds which decompose at elevated temperatures forming chromic oxide as one of the volatile products. Suitable chromium compounds include chromic anhydride ($CrO_3$), ammonium dichromate [$(NH_4)_2Cr_2O_7$], chromic hydroxide [$Cr(OH)_3$], and chromic acid ($H_2CrO_4$). Subjecting the thermocouple to chromic oxide vapors obtained by heating these compounds after being introduced within the protective envelope of the thermocouple produces a coating of chromic oxide thereon which affords protection from corrosive gas action and results in longer life for the unit.

In the case of a thermocouple which is encased in a protective envelope of refractory material, a small amount of any one of the above-named chromium compounds is placed in the bottom of the envelope. At the heat of operation, the compound decomposes and volatilizes, coating the thermocouple with chromic oxide.

Figure 2:
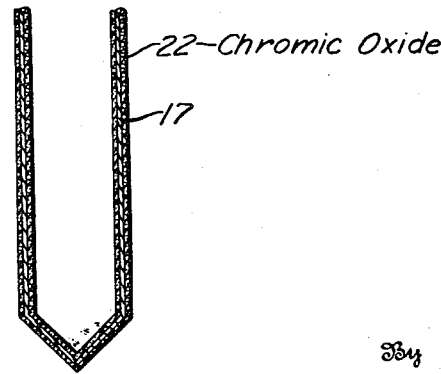

For a better understanding of the invention, reference may now be had to the accompanying drawings in which like numerals refer to like parts and in which:

Fig. 1 is a fragmentary transverse sectional view through the hot zone of a furnace or tunnel employed in the cellulating of cellular glass blocks wherein an elevated temperature is maintained; Fig. 2 is a detail view showing in an enlarged scale a thermocouple element which has been treated in accordance with the provisions of the invention.

In the apparatus shown in Fig. 1, the furnace comprises a bottom 10, a top 11, and sides 12 with rollers of heat resistant steel 13 disposed substantially above the bottom of the lehr to provide a space 14 permitting circulation of gases below the slabs of material being cellulated. Heat is introduced into the circulatory system of the furnace through openings 15 which are provided at the side of the furnace for burners 16 connected to a suitable source, not shown. The position of the temperature measuring device, a thermocouple 17, encased in an envelope 18 of refractory material such as fused silica or quartz and being closed by a refractory plug 19 is herein illustrated. The unit is shown as being disposed above the conveyor carrying the objects e. g. cellular blocks (B) and is connected by conductors 20 with suitable instrumentalities (not shown) for measuring the relatively weak currents generated by the thermocouple. The conductors may also be connected to and control the action of automatic devices designed to increase or decrease the temperature of the chamber.

As shown in Fig. 2, the metallic components of the thermocouple are two dissimilar alloys which are adapted to generate an electromotive force varying with temperature. These alloys may be of the Chromel-Alumel type employed in cellular glass furnaces, of the rhodium-platinum type, or of any metal suitable for use as a thermocouple at elevated temperature. The coating of chromic oxide 22 as contemplated by the invention may be applied by placing in the protective envelope of the thermocouple a chromic compound, such as chromic acid, which decomposes at the operative temperatures given, forming the chromic oxide as one of the volatile products.

In order to demonstrate the effectiveness of the invention a bi-metallic unit (a Chromel-Alumel thermocouple) was used for measurement of temperatures in a furnace for forming a cellulated glass, the operational temperature of which ranges from 1500 to 1600° F. Similar thermocouple elements encased in chromel-T-protection tubes failed to read correctly after a period of two weeks. In contrast, a new thermocouple of similar material encased in a similar protective tube, together with three grams of chromic anhydride, read correctly for a period of a year or more.

The use of the improved chromic oxide-coated thermocouple element, because of its resistance to corrosion, results in considerable reduction of operational time losses and in improved accuracy of temperature measurement. The employment of such protected thermocouples in cellular glass furnaces or lehrs is only to be considered as being by way of example. The invention finds application in other types of furnaces such as kilns, brick furnaces, pottery furnaces or other furnaces used in the ceramic industry, or in any type of furnace operating at a temperature within a range at which a thermocouple is operable but is subject to rapid deterioration.

The forms of the invention herein illustrated are to be considered as by way of example. It will be apparent to those skilled in the art that numerous modifications may be made without departure from the spirit of the invention or the scope of the appended claims.

I claim:

1. A method of increasing the life of a di-metallic unit employed as a thermocouple in the measurement of relatively high temperatures, said unit being encased in a protective envelope of refractory material; which method comprises introducing into the envelope a small quantity of a chromium compound, and thereafter volatilizing the compound to form a coating of chromic oxide upon the thermocouple at the temperature of operation.

2. A method of increasing the life of a bi-metallic unit employed as a thermocouple in the measurement of relatively high temperatures, said unit being encased in a protective envelope of refractory material; which method comprises introducing into the bottom of the envelope 2 grams of chromic acid, and thereafter volatilizing the chromic acid at 1500 to 1800° F. to form a coating of chromic oxide upon the thermocouple.

WALTER D. FORD.

REFERENCES CITED

The following references are of record in the file of this patent:

UNITED STATES PATENTS

| Number | Name | Date |
|---|---|---|
| 589,221 | Placet | Aug. 31, 1889 |
| 1,896,042 | Ruben | Jan. 31, 1933 |
| 2,187,949 | Noble | Jan. 22, 1940 |
| 2,207,558 | Singer | July 9, 1940 |
| 2,310,026 | Higley | Feb. 2, 1943 |
| 2,330,018 | VanWert | Sept. 21, 1943 |
| 2,405,075 | Vollrath | July 30, 1946 |

OTHER REFERENCES

Ruder: Trans. Electrochemical Socy., vol. 27 (1915), pages 259, 262, 263, 265, 256, 257.

Kowalke: Trans. Electrochemical Socy., vol. 32 (1917), pages 218, 219.